United States Patent
Liu et al.

(10) Patent No.: US 7,768,376 B2
(45) Date of Patent: Aug. 3, 2010

(54) CONFORMAL MESH FOR THERMAL IMAGING

(75) Inventors: Chang Liu, Champaign, IL (US); Nannan Chen, Urbana, IL (US); Jonathan Engel, Minneapolis, MN (US); Jack Chen, Freemont, CA (US); Zhifang Fan, Lexington, KY (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 343 days.

(21) Appl. No.: 11/924,016

(22) Filed: Oct. 25, 2007

(65) Prior Publication Data
US 2008/0219320 A1 Sep. 11, 2008

Related U.S. Application Data

(60) Provisional application No. 60/863,702, filed on Oct. 31, 2006.

(51) Int. Cl.
*H01C 7/10* (2006.01)
(52) U.S. Cl. .................. 338/22 R; 338/13; 338/25; 216/58; 438/689
(58) Field of Classification Search ............ 338/22 R, 338/7, 13, 18, 25; 29/610.1; 216/58, 67, 216/83; 438/689, 694, 706, 710, 745
See application file for complete search history.

(56) References Cited

U.S. PATENT DOCUMENTS 5,168,005 A * 12/1992 Keating et al. ............ 442/205
5,524,679 A * 6/1996 Wiener ................... 139/420 R
6,034,374 A    3/2000 Kimura et al.

(Continued)

OTHER PUBLICATIONS

Asai et al. (May 16, 1995) "Development of an Anisotropic Conductive Adhesive Film (ACAF) from Epoxy Resins," *J. Appl. Poly. Sci.* 56(7):769-777.

(Continued)

*Primary Examiner*—Kyung Lee
(74) *Attorney, Agent, or Firm*—Greenlee, Winner and Sullivan, P.C.

(57) ABSTRACT

This invention provides thermal sensors and imagers that are flexible and capable of conforming to curved surfaces and corresponding methods of making and methods of thermal sensing. The thermal sensors contain an array of thermal resistors patterned in a row and column configuration, with each thermal resistor electrically isolated from other thermal resistors within the sensor. Thermal information is obtained from a region by measuring the resistance of each thermal resistor and calculating a thermal resistance for each entry of the array.

32 Claims, 8 Drawing Sheets

U.S. PATENT DOCUMENTS

| | | | | |
|---|---|---|---|---|
| 6,071,819 | A | * | 6/2000 | Tai et al. .................... 438/694 |
| 6,152,597 | A | | 11/2000 | Potega |
| 6,180,867 | B1 | | 1/2001 | Hedengren et al. |
| 6,328,903 | B1 | * | 12/2001 | Vernon, Sr. .................... 216/2 |
| 6,814,706 | B2 | | 11/2004 | Barton et al. |
| 2002/0096018 | A1 | * | 7/2002 | Rodgers et al. ............. 81/3.33 |
| 2005/0026528 | A1 | * | 2/2005 | Forsten et al. ............... 442/414 |
| 2007/0020445 | A1 | | 1/2007 | Liu et al. |

OTHER PUBLICATIONS

Chen et al. (2006) "Flexible Skin with Two-Axis Bending Capability Made Using Weaving-by-Lithography Fabrication Method," 19$^{th}$ IEEE International Conference on Micro Electro Mechanical Systems, Istanbul Turkey, pp. 330-333.

Chen et al. (2005) "Micromachined Thermal Imaging Mesh for Conformal Sensing System," The 4$^{th}$ IEEE International Conference on Sensors, Irvine California, Oct. 31 through Nov. 1, 2005.

Engel et al. (2005) "Polymer Micromachined Multimodal Tactile Sensors," *Sens. Actuators* 117:50-61.

Hsieh et al. (2001) "Thermal Signature for Solder Defect Detection Using a Neural Network Approach," *Proc. SPIE* 4360:636-643.

Jiang et al. (1997) "A Flexible MEMS Technology and its First Application to Shear Stress Sensor Skin," Presented at IEEE International Conference on MEMS.

Lai et al. (Jul. 1995) "Thermal Detection of Device by Atomic Force Microscopy," *IEEE Electron Dev. Lett.* 16(7):312-315.

Park et al. (2002) "The Wearable Motherboard: A Framework for Personalized Mobile Information processing (PMIP)," Presented at ACM IEEE Design Automation Conference.

Sergio et al. (Jun. 2004) "A Textile-Based Capacitive Pressure Sensor," *Sensor Lett.* 2(2):153-160.

* cited by examiner

Fig. 1A
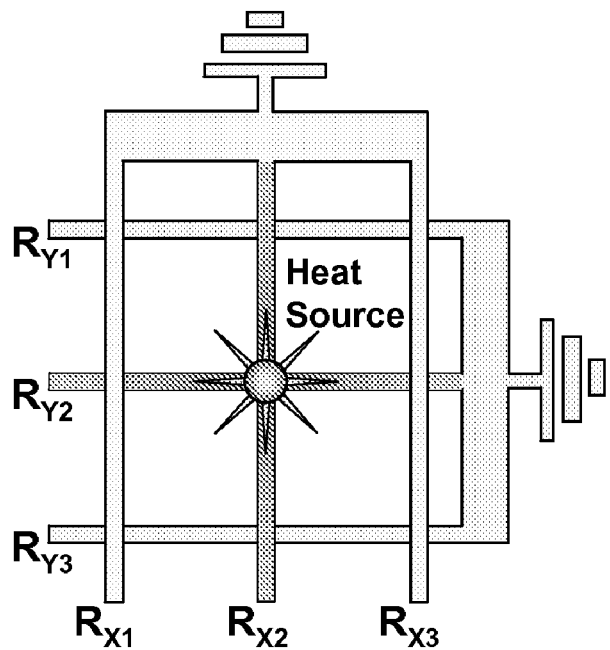
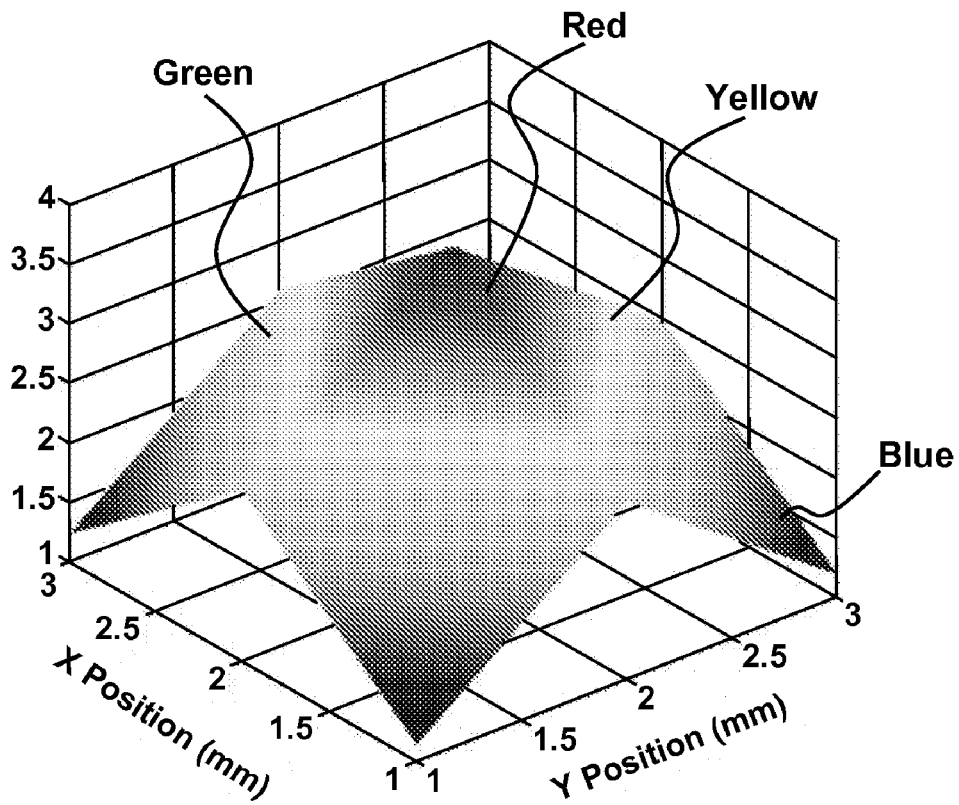
Fig. 1B

CONFORMAL MESH FOR THERMAL IMAGING

CROSS-REFERENCE TO RELATED APPLICATIONS

This application claims benefit of U.S. Provisional Patent Application 60/863,702 filed on Oct. 31, 2006 and is incorporated by reference in its entirety.

BACKGROUND OF THE INVENTION

The present invention is in the field of conformal thermal sensing and imaging. Conformal temperature sensing has applications in a number of fields. Conformal sensing of various physical parameters is ongoing. A number of researchers have used micromachining techniques to develop sensitive skin sensors for robotics. Flexible multimodal polymer sensor arrays have been realized as well as shear sensor arrays with embedded silicon elements. Even though these devices are able to achieve some degree of conformability, the conformability is restricted to simple curvatures like a cylinder. They cannot stretch or conform to accommodate three-dimensional objects like a sphere, and thus fail to fulfill their roles as "skins". Other researchers have explored embedding wires and sensors in traditional textile fabrics to yield "smart fabrics" capable of sensing biometrics of the wearer. The present invention uses a combination of these approaches to create micromachined fabrics with embedded temperature sensors that have good conformability to three-dimensional objects.

The decoding of localized thermal input has been utilized to detect the defects in circuits of both discrete and integrated electronic components. This does not only apply to thermal sensing, but also more generally to when a localized input is acquired over a relatively sensing area, and usually involves large number of sensor arrays, cumbersome wiring and complicated test setup. The present invention comprises sensing and processing schemes that can greatly reduce the number of sensors required and associated testing complexity. In addition, the present invention facilitates conformal imaging by embedding the temperature sensors in micromachined fabrics.

Advances in integrated circuits, semiconductor materials, and micro-machining techniques are being combined in interesting ways with everyday items in an effort to reduce their obtrusiveness. This includes efforts to develop wearable computers, cell phones, medical diagnostic sensors, and so forth. A key segment of this work is the development of what can be termed "smart fabrics". Smart fabrics can take many forms, but in general represent textiles that perform a specific engineered task such as routing wires, sensing, providing power (e.g., solar cells), serving as an actuator or serving as an antenna while functioning as a mechanical component of an item of clothing. Examples of work in this area include development of strain and temperature sensitive fabrics for injury rehabilitation, fabric-based antennas and inductors for wireless communication and networking, CMOS-based flexible pressure sensitive fabrics, bio-monitoring fabric, and a number of efforts to develop fabrics that can serve as circuit boards for wearable computing. The present invention has uses in any one or more of these areas, for example.

Temperature monitoring devices have been disclosed. For example U.S. Pat. No. 6,152,597 is directed to a conformable device for temperature monitoring of a power source and U.S. Pat. No. 6,814,706 to a skin patch for temperature sensing. Those devices, however, are rather limited in their ability to sense spatial thermal distribution over a surface, including a planar, non-planar or bent surface. U.S. Pat. No. 6,180,867 discloses a surface conformable thermal sensor array for diagnosing breast cancer. That sensor, however, requires a large number of thermal sensors and associated wiring in order to obtain an accurate thermal image. Similarly, U.S. Pat. No. 6,034,374 is configured so that the image requires a large number of individual thermal sensors. Previously disclosed temperature sensors generally suffer the drawback of requiring an excessive number of thermal sensing elements to adequately resolve a thermal image. Further, many conventional temperature sensors lack the mechanical conformability required to provide accurate measurement of temperature distributions of non-planar (e.g., curved) surfaces. The present invention overcomes these limitations by selectively orienting thermal resistor wires within separate conformable polymer layers.

SUMMARY OF THE INVENTION

The present invention relates to a thermal sensor that comprises a micromachined thermal imaging mesh for conformal sensing. The devices and methods of the present invention rely on patterned rows and columns of thermal resistors to significantly decrease the total number of thermal resistors required for thermal imaging. The thermal sensor is flexible and extensible and, thus, capable of stretching without damage or significant degradation in sensor performance. The thermal sensors of the present invention are capable of mechanical deformations to cover contoured surfaces conformally, including curved surfaces having a large radius of curvature. Thermal sensors of the present invention may be free standing and capable of efficient integration with a range devices and device components, including integrated sensors, actuators, electronic circuits, power supplies and displays. Furthermore, the thermal sensors of the present invention are capable of integration with various fabrics, woven networks and/or mesh network of elements.

An object of the present invention is to provide versatile methods of making flexible thermal sensors having a wide range of physical dimensions, including sensors and sensor combinations capable of thermally imaging regions having a wide range of surface areas, including large surface areas, such as surface areas between about 10 mm$^2$ and about 1 m$^2$. The present invention further provides methods of thermal sensing from thermal sensors having a reduced number of thermal resistors while still maintaining acceptable thermal resolution.

In an embodiment, the thermal sensor comprises one layer of thermal resistors of number m, and a second layer of thermal resistors of number n, to generate a thermal image comprising m*n data points. For large m and/or n, this provides a significant decrease in the number thermal sensors compared to instruments that use one thermal resistor for each data point entry of the m×n matrix (e.g., m+n<m*n). The sensing and processing schemes of the present invention are versatile and permit thermal imaging over small or large regions, including solid surfaces having curved, planar, or curved and planar contour profiles. The sensor is particularly useful in the presence of a localized heat source over a broad piece of imaging mesh. At the same time, this approach dramatically reduces the number of sensors, and hence the wiring required to image a given area.

The thermal sensor, in an aspect, comprises an array of thermal resistors. The plurality of thermal resistors corresponding to an array column (or row) is deposited on the surface of a first polymer layer and covered by an insulative polymer layer. The plurality of thermal resistors corresponding to an array row (or column) is deposited on the insulative polymer layer and covered by a second polymer layer. The polymer layers are bendable and flexible to facilitate overall sensor conformability to non-planar surfaces. Surrounding temperature changes (e.g., temperature change in a region that is being thermally sensed) generate a temperature change in a polymer layer and corresponding change in temperature of one or more thermal resistors. The thermal resistor temperature change is detected by monitoring the resistance of each thermal resistor. Spatial changes in thermal resistor resistance correspond to temperature changes in the region being sensed. Monitoring magnitude of resistance changes in the thermal resistance provides magnitude sensing of temperatures.

The thermal resistors can comprise metals whose resistance changes with temperature. Gold is a particularly useful metal as it is compatible with anisotropic conductive film for connecting the thermal resistor to outside electrical connections. Gold is also stable and relatively resistant to corrosion. In an exemplified embodiment, the polymer layers are made from polyimide. Polyimide polymer layers are sufficiently flexible to facilitate conformal contact with a three-dimensional surface, such as a portion of a sphere surface. To further facilitate sensor flexibility, thermal resistors that are wires can comprise curved portions to minimize stress in the thermal resistors as the sensor deforms. In an aspect, the thermal resistors are curved, periodically curved or serpentine. In an aspect, the devices of the present invention comprise polymer layers having a thickness, such that the total thickness of a thermal sensor of the present invention is less than about 20 µm, and each of the top and bottom polymer layers have a thickness ranging from 3 µm to 10 µm, 5 µm to 7 µm, or about 6 µm. The insulative layer separating the top and bottom layers preferably has a smaller thickness than the top and bottom layers, including ranging from between 0.5 µm and 3 µm, or about 1 µm.

The dimensions and spacing of thermal results are selected to optimize thermal imaging and depends on the size of the surface to be imaged. In an aspect, the thermal sensor has a spatial resolution of at least 1 $cm^2$, 5 $mm^2$, or at least 1 $mm^2$. Thermal resistors having a serpentine pattern achieve a resolution of about 1.5 $mm^2$. Resolution is improved using straight line thermal resistors that are interwoven with the adjacent layer. Regions to be thermally sensed having larger footprints can have lower spatial resolution compared to smaller regions. Spatial resolution is affected, in part, by thermal resistor spacing within a layer. Thermal resistors can be separated by a distance ranging from between tens of centimeters to about five microns. In an aspect, the thermal resistors are separated by a distance ranging from between about 1 cm and about 0.1 mm, or about 1 mm. In an embodiment, the number of thermal resistors in a layer is between 3 and 1000, 10 and 100, 13 and 50, or about 13.

In an aspect, the thermal resistors have an independent power source such that a change in resistance of an individual thermal resistor does not itself change the voltage across or current through any other thermal resistor. It is particularly useful to supply the thermal resistors with an electric current when a heat sink is being sensed. Alternatively, one or more thermal resistors can be connected in a parallel configuration, such that a change in the resistance of one thermal resistor can affect a change in an electrical property (e.g., current, resistance) for other thermal resistors connected in a parallel configuration. Preferably, one end of each resistor is connected to a common ground, and the other end of each resistor is not electrically connected to another resistor. In an embodiment, no power source is connected to any of the thermal resistors and temperature change is monitored by measuring a resistance change that changes from baseline. In an aspect, the invention further comprises a "read out" system for obtaining and/or displaying information supplied by the sensor. The read out comprises any means known in the art for measuring the physical parameter output by the sensor element. For the exemplified temperature sensor that outputs resistance, the read out can comprise manual measuring the resistance, automated fast-circuit switching, as well as associated devices for providing an output to display or record the physical parameter.

In an embodiment, the thermal sensor is a free-standing conformable mesh comprising layers of flexible polyimide fabric, with a first pattern of thermal resistors between the first and insulative polyimide layers and a second pattern of thermal resistors between the insulative and second polyimide layers, wherein the first and second patterns are in a row and column (or vice versa) configuration. Thermal resistors having serpentine structure further improve the conformability of the fabric to three-dimensional objects. In an exemplified embodiment, the thermal resistors are gold wires about 50 µm wide and 5000 Å in depth, the outside polyimide layers are about 6 µm thick, and the insulative layer separating the thermal resistor layers is about 1 µm, so that the free-standing mesh thermal sensor is about 13 µm thick. The flexible free standing structures of the present invention also provide thermal sensing and regulation systems for selectively conducting and distributing thermal energy. The "insulative layer" refers to a layer that is an electrical insulator (e.g., a substance that is highly resistant to electric current), such as a dielectric material. In the thermal sensing embodiment, the layers are preferably thermally conductive to maximize thermal resolution and sensitivity.

In one embodiment, a method of the present invention is provided for making a thermal sensing mesh. A first sacrificial layer is provided on a substrate. A first patterned thermal resistor structural layer comprising a first plurality of thermal resistors having a first selected spatial arrangement is subsequently provided on the first sacrificial layer. First plurality of thermal resistors useful for this aspect of the present invention are arranged such that they are not in direct physical contact with each other, have inner surfaces in contact with the structural layer and have outer surfaces opposite to their inner surfaces. An insulative layer is provided that coats the thermal resistor opposite surfaces.

A second patterned structural layer comprising a plurality of second plurality of thermal resistors having a second selected spatial arrangement different from the first spatial arrangement is provided on the insulative layer and first structural layer. Second plurality of thermal resistors useful for this aspect of the present invention are arranged such that they are not in direct physical contact with each other, have inner surfaces in contact with the structural layer and have outer surfaces opposite to their inner surfaces that interact with the insulative layer and/or the first structural layer, thereby ensuring the thermal resistors are axially covered with a polymer, corresponding to structural polymer layer on one side and insulative polymer layer on the other side.

In an aspect, the second plurality of thermal resistors are patterned directly onto the insulative and first structural layer, with the second plurality of thermal resistors and at least a portion of the first structural layer covered with a second structural layer. In an embodiment, the insulative and/or structural layers are made from a polymer including, but not limited to, polyimide. Second plurality of thermal resistors useful in this aspect of the present invention are arranged such that they are not in direct physical contact with each other or with any of the first plurality of thermal resistors.

The invention, in an embodiment, removes the sacrificial layer to release the first patterned thermal resistor structural layer, thereby obtaining a free-standing thermal sensing mesh. A free-standing thermal sensing mesh having layers made from flexible polymers is capable of conforming to a contoured surface. Any of the thermal sensors and methods of making such thermal sensors can comprise one or more additional layers of thermal resistors to further enhance thermal sensing and imaging.

The polymers are provided on adjacent surfaces by any means known in the art. In an aspect, any one or more of the polymer layers is provided by spinning a prepolymer on the layer or thermal resistor surface to be covered, optionally patterning the polymer in a pattern corresponding to a pattern of to-be-received thermal resistors, and curing the polymer. The patterning of polymer layers or thermal resistors is by any means known in the art including soft lithography, ink lithography, optical lithography, transfer printing, electrochemical etching/deposition, etc.

The thermal sensors of the present invention can be connected to external components, such as conducting wires useful in connecting power supplies (constant current or constant voltage), resistance meters, transmitters, image displays, fabrics, printed circuit board ("PCB"), surfaces, etc.

In another aspect, the invention provides a method of thermal sensing using any of the thermal sensors claimed herein. A thermal sensor having a first and a second plurality of thermal resistors, such that an n column by m row array of thermal resistors is provided. The thermal resistors are then charged and a resistance is determined. The thermal sensor is engaged with a region to be thermally sensed and the change in resistance in each of the n and each of the m thermal resistors is measured. "Engaged" encompasses contact such as physical contact or thermal contact. The region is thermally sensed by calculating an array of resistance entries according to the product of resistance changes in thermal resistors that are said to virtually intersect (e.g., crossover), as given by Formula (1):

$$Z_{(i,j)} = \delta R_{yi} * \delta R_{xj} \quad (1)$$

A thermal image is obtained by displaying each of the Z thermal resistance entries of the matrix, wherein each entry corresponds to the virtual intersection between the row and column of thermal resistors. The display can be a three-dimensional graphical representation, an intensity display (e.g., brighter intensity or different colors corresponding to magnitude of resistance or temperature) or numerically. By calibrating each of the thermal resistor resistance as a function of temperature, the thermal image is optionally converted to a temperature image, wherein a display of temperature over a surface is obtained. Temperature images obtained by the present sensors/imagers include two-dimensional and three-dimensional temperature images. Such a calibration is performed by, for example, uniformly heating the thermal mesh to a known temperature and calibrating calculated Z values to the known temperature. More accurate calibration involves positioning a point source of known temperature over each of the thermal resistor intersection points and recording the resultant resistance entries. This is repeated for various temperatures to obtain a corresponding temperature for the resistance matrix entry of Formula (1).

The multilayer conformable sensor design of the present invention is broadly applicable for other sensing applications. Non-thermal sensing applications supported by the present sensor design strategies include, but are not limited to, chemical sensing, pressure sensing, optical sensing and/or strain sensing. In these embodiments, instead of using an m×n matrix of sensors, the present invention uses m+n sensors in a similar matrix distribution that is capable of conformal contact, without a significant sacrifice in sensitivity or resolution. For example, the present invention includes sensor systems wherein thermal resistors supported by the thin polymer layers are replaced by other types of sensors known in the art of sensing. The present design strategies are also applicable for providing conformable photovoltaic arrays.

BRIEF DESCRIPTION OF THE DRAWINGS

FIG. 1A schematically illustrates an array of thermal resistors, with each resistor distinguished by an individual line labeled "R". The virtual intersection point corresponds to the location of cross-over points. FIG. 1B shows that such an array is useful for surface thermal imaging by calculating Z(i,j) according to Formula (1).

DETAILED DESCRIPTION OF THE INVENTION

Figure 2:
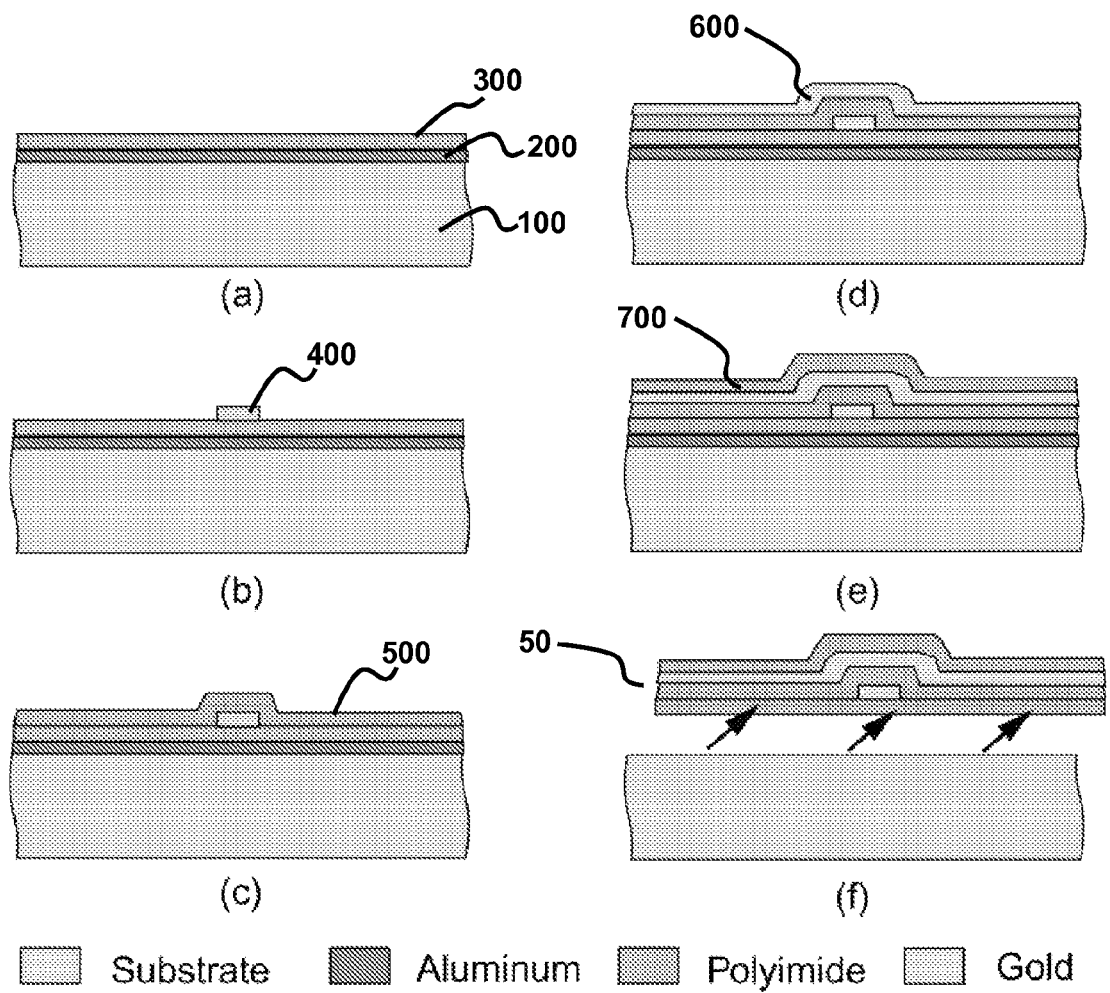
FIG. 2 illustrates a fabrication process for constructing a free standing thermal imaging mesh.

"Thermal sensor" refers to a device or device component for assessing/measuring temperature distribution and heat sources on a surface. A "thermal imager" refers to a thermal sensor that visually displays a temperature distribution corresponding to a surface or plurality of surfaces. In this context, "surface" refers to the surface of the device that engages a region that is to be thermally imaged or sensed, so that a temperature change in any portion of the region effects a temperature change in the thermal sensor surface. Temperature change in the sensor surface is measured by change in resistance of one or more thermal resistors within the thermal sensor. The region to be thermally imaged or sensed can itself be a surface, including a contoured surface. Alternatively, the thermal sensor surface can be adjacent to a non-solid region, such as gas, liquid or vacuum, so long as the sensor is capable of detecting variations in temperature of the region.

"Thermal resistor" is used analogously to the term "thermistor" and refers to devices that exhibit a resistance whose value is dependent on temperature. Commonly-used thermistors are semiconductor devices and have a resistance of a few thousand ohms at room temperature, and are available with tight conformity (e.g., 0.1-0.2° C.) to standard resistance-temperature calibration curves. The thermistors of the present invention preferably comprise metal wires, including gold, platinum and other conductive materials whose resistance varies with temperature. The thermal resistors used herein preferably have a large coefficient of resistance change to facilitate accurate temperature measurement over relatively large temperature ranges and high resolution thermal imaging. Depending on the thermistor and device construction; the thermal imagers of the present invention are useful for sensing surface temperatures over a wide range of temperatures, so long as the temperature does not cause significant degradation of the polymer layers and can include temperatures ranging from between about −50° C. to about 300° C. Various circuitries useful in measuring temperature based on the output of a thermal resistor is known in the art. (see, e.g., Horowitz and Hill (1989) "The Art of Electronics" pp 988-996). The exemplified embodiment uses gold thermistors having a baseline (e.g., room temperature) resistance of about 500Ω. A thermal resistor used in the present invention, in its most basic composition, comprises a length of conducting wire whose resistance varies with temperature. The conducting wire can be made of a metal, for example gold, nickel or platinum. The thermal resistor can have a positive temperature coefficient (PTC) or a negative temperature coefficient (NTC).

The thermal resistors of the present invention are patterned in an array. As used herein, "array" refers to the patterning of thermal resistors in at least two distinct layers, wherein each layer orients the thermal resistors in a longitudinal direction, and each layer has a different longitudinal direction than any other layer. A thermal image generated by the devices of the present invention comprises an array of thermal resistive values corresponding to the location of a virtual intersection point (e.g., cross-over of thermal resistors in adjacent layers). Accordingly, the number of resistive entries in the matrix upon which a thermal image is based is the product of m*n, wherein m is the number or thermal resistors in a first layer, and n is the number of resistors in the second layer.

"Longitudinal direction" refers to the long axis orientation of the thermal resistor. For a straight line wire thermal resistor, this direction is parallel to the direction of the wire. For a serpentine wire, this direction is obtained by calculating a center-line average position, and the direction of this center-line corresponds to the longitudinal direction.

"Polymer" refers to a molecule comprising a plurality of repeating chemical groups, typically referred to as monomers. Polymers are often characterized by high molecular masses. Polymers useable in the present invention may be organic polymers or inorganic polymers and may be in amorphous, semi-amorphous, crystalline or partially crystalline states. Polymers may comprise monomers having the same chemical composition or may comprise a plurality of monomers having different chemical compositions, such as a copolymer. Cross linked polymers having linked monomer chains are particularly useful for some applications of the present invention. Polymers useable in the methods, devices and device components of the present invention include, but are not limited to, plastics, elastomers, thermoplastic elastomers, elastoplastics, thermostats, thermoplastics and acrylates. Exemplary polymers include, but are not limited to, acetal polymers, biodegradable polymers, cellulosic polymers, fluoropolymers, nylons, polyacrylonitrile polymers, polyamide-imide polymers, polyimides, polyarylates, polybenzimidazole, polybutylene, polycarbonate, polyesters, polyetherimide, polyethylene, polyethylene copolymers and modified polyethylenes, polyketones, poly(methyl methacrylate, polymethylpentene, polyphenylene oxides and polyphenylene sulfides, polyphthalamide, polypropylene, polyurethanes, styrenic resins, sulphone based resins, vinyl-based resins or any combinations of these. The polymers used in the present invention are preferably capable of fast response time to change in temperature, so that a change in temperature of a region can be detected by a thermal sensor faster than 30 seconds, 10 seconds, or 1 second. The actual response time depends on a number of factors, including properties of the thermal resistors and polymers that insulate the thermal resistors, the thickness of the polymer layer, how far the polymer surface is from the region to be thermally imaged, as well as the magnitude of the temperature variation to be sensed.

A "polymer layer" of the present invention refers a polymer that covers at least a portion of an adjacent surface. The adjacent surface may itself be another polymer layer or a different layer such as a sacrificial layer. A layer can have any thickness, so long as the thermal sensor remains capable of determining temperature changes in a to-be-sensed region and exhibits a desired degree of conformability. In an aspect, the polymer is selected to have appropriate physical properties, such as Young's modulus, so that the layer is conformable. The layers preferably have a thickness between about 0.5 µm and 50 µm, or between 0.5 µm and 20 µm, or between 0.8 µm and 10 µm.

The patterning of thermal resistors or polymer surfaces for receiving thermal resistors uses any one or more methods known in the art and includes optical lithography patterning, physical and chemical vapor deposition, printing methods including micro- and nano-contact printing, and methods using binding agents such as thin metal layers and adhesives. Chemical and physical deposition methods using wafer or polymer substrates combined with photolithography patterning methods are preferred for some applications because these well developed techniques provide very accurate control of the physical dimensions, spatial arrangements and compositions of structural elements of patterned structural layers.

Fabrication and processing methods of the present invention include use of deposition methods such as physical and chemical deposition techniques, casting methods and spin coating techniques. Patterning of thermal resistors in the present invention is achievable by any method providing control over the spatial arrangement, preferably control of the position of individual thermal resistors to within 1, 0.1 or 0.01 microns or less. Patterning of thermal resistors in the present invention may be carried out using a single patterning processing step or a plurality of processing steps, including masking, etching, developing and deposition steps. Fabrication and processing methods of the present invention include use of conventional optical photolithography, electron beam lithography, ion beam lithography, soft lithography, deep UV lithography, ion beam lithography, proton beam lithography, immersion lithography and soft lithography methods such as micro- and nano-contact printing. Processing methods whereby materials are deposited and patterned on a wafer substrate are beneficial because they allow heterogeneous integration of a wide range of materials, including high quality semiconductor, dielectric and conducting materials, and because they allow for fabrication using thermal resistive layers having a high density of thermal resistive elements.

"Sacrificial layer" refers to a layer that supports one or more structural layers and is ultimately removed during fabrication to form a structure, including free-standing structures and functionalized structures and/or devices of the present invention. Sacrificial layers of the present invention may have any thickness resulting in useful structures and devices, preferably for some applications thicknesses ranging from about 1 nanometer to about 1 cm. Structural layer may comprise a wide range of materials including, but not limited to, photoresists, metals, polymers, and oxides such as $SiO_2$. Sacrificial layers may be removed via any technique know in the art of micro- and nanofabrication including, but not limited to, reactive and plasma etching, developing, dissolving and application of chemical agents.

"Temperature variation" refers to either a temperature change in the entire region that is being thermally imaged and/or a change in spatial temperature distribution of the region such as by the introduction of a heat source or sink, for example. Accordingly, the devices of the present invention are useful for locating the position of a heat source or sink, as well as for imaging the thermal distribution over a surface or region. A temperature variation is detected by the thermal imagers or sensors of the present invention by a "resistance variation" in one or more of the thermal resistors within the imager or sensor. Resistance variation refers to a detectable change in resistance that is attributed to a temperature variation.

"Resolution" is used herein in two aspects: (i) spatial resolution (distinguishing the temperature in one area from another area) and (ii) thermal resolution (ability to resolve a change in temperature). The ability to resolve the position of a heat source or sink is constrained by the geometry and spacing (e.g., the pattern) of the thermal resistors. A "tightly packed" matrix of thermal resistors is capable of higher spatial resolution than a matrix that is relatively sparser. This spatial resolution affects the resolution of the thermal image. The ability to resolve temperature depends also on the physical properties of the thermal resistors. Thermal resistors having higher temperature coefficients have correspondingly higher temperature resolution, wherein smaller temperature changes can be reliably detected.

"Engaging" is used herein to refer to a thermal sensor positioned relative to a region such that temperature changes to the region are capable of conveying a corresponding temperature change in the polymer layer of the thermal sensor such that the temperature change is sensed by the thermal sensor. In the exemplified embodiment, a heat source that is 2 mm from the thermal sensor is detected, so that this region that is 2 mm from the thermal sensor is characterized as engaged with the thermal sensor. Engaging similarly encompasses a thermal sensor that is in physical contact with a two- or three-dimensional surface to be thermally sensed. In some embodiments, engaging refers to providing the sensor in thermal contact and/or physical contact with a surface to be sensed.

"Flexible" refers to a mechanical property indicating the ability of a material, layer, structure, device or device component to stretch, bend, deform and/or conform to a contoured surface without fracture.

The term "bendable" refers to a mechanical property indicating the ability of a material, structure, device or device component to be deformed into a curved shape without undergoing a transformation that introduces significant strain, such as strain characterizing the failure point of a material, structure, device or device component. In an exemplary embodiment, a flexible material, structure, device or device component may be deformed into a curved shape without introducing strain larger than or equal to about 300%.

"Extensible" and "stretchable" are used synonymously in the present description and refer to the ability of a material, structure, device or device component to be strained without undergoing fracture. Some stretchable materials, structures and devices of the present invention are capable of exhibiting at least some expansion and/or compression without mechanical failure. In one embodiment, a stretchable structure of the present invention is capable of undergoing a change in its overall footprint area by about 5% along a given direction, and in some embodiments along two directions such as directions oriented orthogonal to each other. Stretchablility in some embodiments is caused by elements of structures of the present invention that are capable of movement or displacement in relative to each other (e.g., thermal resistors that are interwoven as disclosed in U.S. application Ser. No. 11/421,173, herein specifically incorporated by reference).

"Fabric" refers to a network of associated elements, such as assemblies of adjacent polymer layers, interconnected or interlinked structural elements of structural layers, that are associated in a manner providing at least some degree of independent displaceability, independent rotatability or independent displaceability and independent rotatability of interconnected or interlinked structural elements comprising the fabric. The present invention provides flexible fabrics and methods of making flexible fabrics comprising micro- and nano-machined networks of woven elements, mesh elements, knit elements, matrix elements, and combinations of these, wherein the exemplified element is a thermal resistor.

"Conformable" refers to the capability of a material, structure or device to macroscopically adapt to the overall shape of one or more surfaces of a structure, including planar, contoured surfaces such as a convex and/or concave surfaces including highly contoured surface such as spherical surfaces having a large radius of curvature, and irregular surfaces having edges, complex contour such as surfaces having both convex and concave surface features. The conformability of conformable structures, materials and devices of the present invention may be provided by bendability, for example bendability along 2 axes such as two orthogonal axes. In some embodiments, conformable structures, materials, and devices of the present invention are capable of adapting to the overall shape of contoured (e.g. curved) surfaces having large local radius of curvature, including but not limited to adaptation to at least a portion of the overall shape of a sphere having a 0.5 centimeter radius. In some embodiments, a conformable structure of the present invention is capable of macroscopically adapting to the overall shape of one or more surfaces of a structure via intimate contact without voids or kinks. The surface to be thermally sensed or imaged can be planar or non-planar. A surface with a "contour profile" refers to a surface that is at least partially non-planar including but not limited to, concave, convex or that has an edge.

"Free-standing" refers to a structural configuration wherein at least a portion of the surfaces of an element, such as the bottom and/or side surfaces of the element, are not fixed or structurally adhered to another surface or structure, such as a mother wafer or bulk material. Free standing structures may be in a configuration wherein they are supported by, but not fixed or bonded to, another surface and/or structure, such as a mother wafer, bulk material or substrate. In some embodiments, free standing structures of the present invention are not fixed or bonded to any other surfaces or structures.

This invention provides free-standing structures, functionalized free-standing structures and functional devices that are flexible, including nano- and micromachined flexible fabrics comprising a matrix of thermal resistors comprising a plurality of thermal resistor layers. The present invention provides processing methods for making and functionalizing flexible free-standing structures having a wide range of integrated materials, devices and device components for thermal sensing. The methods of the present invention are capable of providing large area functional thermal sensing which exhibit good device performance in stretched, bent and/or deformed configurations.

In the following description, numerous specific details of the devices, device components and methods of the present invention are set forth in order to provide a thorough explanation of the precise nature of the invention. It will be apparent, however, to those of skill in the art that the invention can be practiced without these specific details.

Whenever a range is given in the specification, for example, a temperature range, a size range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference in their entirety to indicate the state of the art as of their publication or filing date and it is intended that this information can be employed herein, if needed, to exclude specific embodiments that are in the prior art.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein may be practiced in the absence of any element or elements, limitation or limitations which is not specifically disclosed herein.

One of ordinary skill in the art will appreciate that starting materials, materials, reagents, synthetic methods, purification methods, analytical methods, assay methods, and methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

EXAMPLE 1

Array Methodology for Thermal Sensing

The thermal sensing mesh consists of an m-by-n matrix of gold thermal resistor network. But instead of having m×n number of individually addressable sensors, only m+n number of sensors are used to address the individual entries of the m-by-n matrix. The significance of this sensor configuration is obvious at large values of m and/or n.

The sensing of a localized heat source is accomplished by the joint entry of two layers of insulated thermal sensors. The bottom layer consists of m rows of gold thermal resistor named $R_{y1}$ to $R_{ym}$; the top layer consists of n columns of thermal resistor named $R_{x1}$ to $R_{xn}$ (see FIG. 1A for n=m=3). Consider an ideal localized heat source over the point (i, j) on the matrix. As a consequence of the elevated temperature, the corresponding $R_{yi}$ and $R_{xj}$ of the thermal resistors increases. The percentage change of resistance is calculated and recorded. The entry $Z_{(i, j)}$ is determined by the product of the percentage change in $R_{yi}$ and $R_{xj}$. This also applies to all the other entries on the matrix. Therefore, any particular entry of the matrix, $Z_{(i, j)}$, is determined by Formula (1):

$$Z_{(i,j)} = \delta R_{yi} * \delta R_{xj} \tag{1}$$

Even though the change in one resistor will affect the entries of the entire corresponding row or column (as evident from Formula (1)), the effect is greatly intensified at the crossing point of two changing resistors. As a result, a peak will be observed on the 3D graph of the matrix, which corresponds to the location of the heat source. To better illustrate the idea, an example of 3×3 matrix is demonstrated in FIG. 1.

FIG. 1A demonstrates the operation of a 3×3 matrix thermal imaging mesh. An ideal localized heat source is present over the point (2, 2). As a result, $R_{y2}$ and $R_{x2}$ increases. According to formula (1), the entry $Z_{(2, 2)} = \delta R_{y2} * \delta R_{x2}$. Note that $Z_{(1, 2)}$, $Z_{(3, 2)}$, $Z_{(2, 1)}$, and $Z_{(2, 3)}$ are also affected by the resistance change of $R_{y2}$ and $R_{x2}$, but the magnitude is much lower than $Z_{(2, 2)}$. By measuring the resistance for each of the thermal resistors (e.g., six), a 3D graph of the matrix is presented in FIG. 1B. A peak appears at (2, 2) as expected showing the location of the heat source. A "virtual intersection point" corresponds to the cross-over point, as illustrate in FIG. 1A.

This approach of having an array comprising one row of thermal resistors in one layer, and one column of thermal resistors in another layer, dramatically reduces the number of sensors and thus wiring required to image a given area. The trade-off with the set-up of the present invention is a reduction in imaging resolution, especially of thermal images that have a complex shape. Nonetheless, the resolution associated with the thermal imagers of the present invention is sufficient for detecting localized input. A similar approach is used for textile based capacitive pressure sensor.

EXAMPLE 2

Fabrication of Conformable Array

An example of a fabrication process for making a thermal imaging mesh is summarized in FIG. 2. First, 2000 Å of Al is evaporated onto a 2-inch Si wafer 100 as sacrificial layer 200. On top of the Al layer 200, a first layer of polyimide 300 is spun on, patterned and cured (FIG. 2A). The resultant thickness is about 6 μm. This thick layer of polyimide serves as the base structural layer of the fabric. Then the first layer of 5000 Å gold is evaporated and patterned into 50 μm wide lines 400. These resistor lines form the rows of the thermal resistor network (FIG. 2B). On top of the first gold layer, a second layer of polyimide 500 is spun on, patterned and cured. The resultant thickness is about 1 μm (FIG. 2C). This thin layer of polyimide serves as the insulation layer 500 between the first and second layer of gold thermal resistors. Following the insulation layer, the second layer of 5000 Å gold is evaporated and patterned into 50 μm wide lines 600 (FIG. 2D). These resistor lines form the columns of the thermal resistor network. Then a third layer of polyimide 700 is spun on, patterned and cured (FIG. 2E). The resultant thickness is again about 6 µm. This second thick layer of polyimide serves as the top structural layer of the fabric. As a result, the total thickness of the fabric is now about 13 µm, which is robust enough to be handled by hands. The Al sacrificial layer is etched away to release a piece of freestanding thermal sensing mesh 50 (FIG. 2F).

Figure 3:
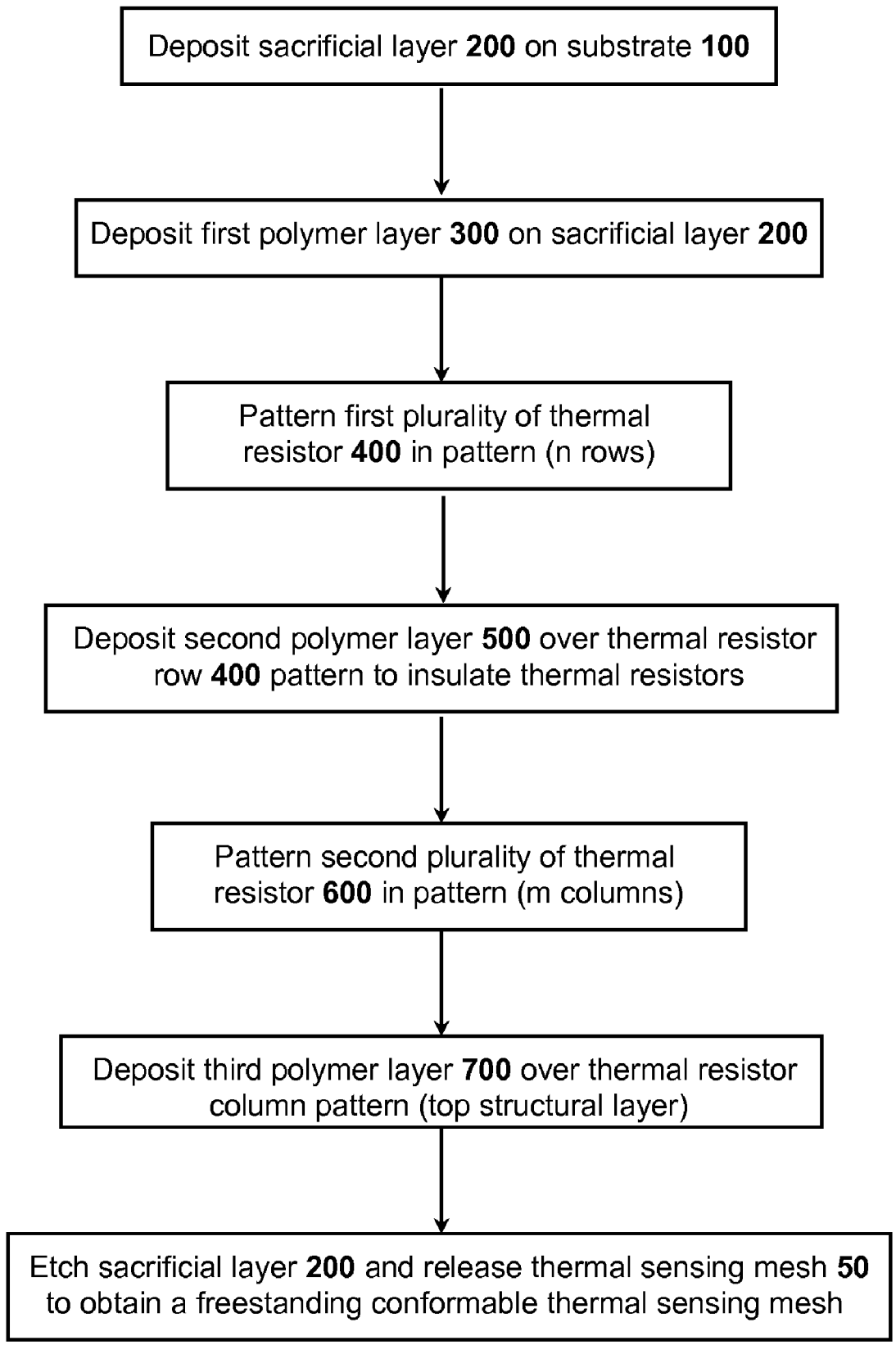
FIG. 3 provides a process diagram for manufacturing a free-standing thermal sensing mesh that is used in the thermal imagers of the present invention.

An overall process for making a free-standing conformal thermal sensing mesh is further summarized in FIGS. 3 and 4. A sacrificial layer 200 is deposited on a substrate 100. A first polymer layer 300 having an internal surface 310 is placed or deposited on sacrificial layer 200. Thermal resistors are patterned on or in the internal surface 310 of polymer layer to generate a first plurality of thermal resistors 400 having a first longitudinal direction. FIG. 4A illustrates three thermal resistors patterned in a column-like longitudinal direction. An insulative polymer layer 500 is deposited or placed over at least a portion of the internal surface 310 and exposed top and longitudinal edges of thermal resistors 400. The ends of the thermal resistors 400 can optionally be left uncoated to facilitate connection to other thermal imager components such as electrical conductors, power supply, resistance meter, multimeter, PCB, etc.

Figure 4A:
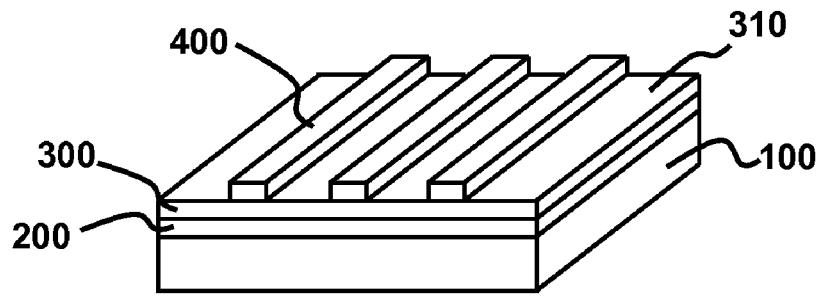
FIG. 4 is a schematic illustration of the device generated by the different steps of the process outlined in FIG. 3.
Figure 4B:
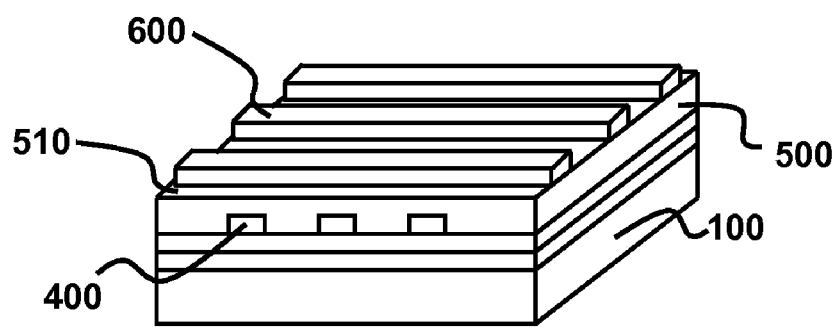

A second set of thermal resistors are patterned on or in the top face 510 of insulative layer 500 to generate a second plurality of thermal resistors 600 having a second longitudinal direction. FIG. 4B illustrates three thermal resistors patterned in a row-like direction and that the first and second plurality of thermal resistors has orthogonal (e.g., "perpendicular") longitudinal directions relative to the other. In this fashion, any number of resistors can be patterned having any longitudinal direction. In a preferred embodiment, the first and second longitudinal orientations are substantially orthogonal. Substantially orthogonal refers to orthogonality that is within 10%, 5% or 1% of orthogonal. Two longitudinal directions are "orthogonal" with respect to each other if they are within 1% of forming a 90° angle with one another.

Figure 4C:
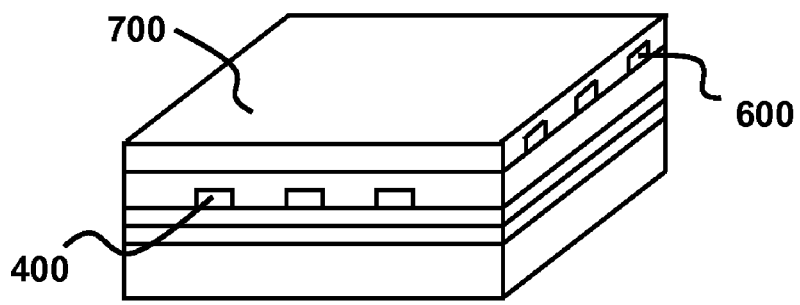
Figure 4D:
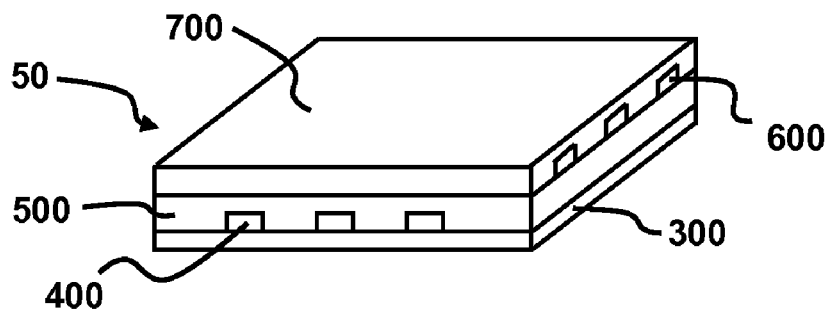

A second polymer layer 700 covers the exposed top and edges of thermal resistors 600 and provides electrical isolation to resistors 600 (FIG. 4C). The ends of the thermal resistors 600 can optionally be left uncoated to facilitate connection to other thermal imager components such as electrical conductors, power supply, resistance meter, PCB, etc. This layer 700 can provide further structural support to facilitate handling after thermal sensing mesh 50 is removed from substrate layer 100 by etching away sacrificial layer 200 (FIG. 4D). As illustrated in FIG. 2C-F, polymer layers need not have surfaces that are planar, but can have curves and/or discontinuities due to the presence of thermal resistors 400 and/or 600. After etching and release, the freestanding thermal imaging mesh 50 is ready for subsequent electrical connections to ends of thermal resistors 400 and 600 (e.g., by ACF) and integration with other devices useful for generating thermal images.

Figure 5:
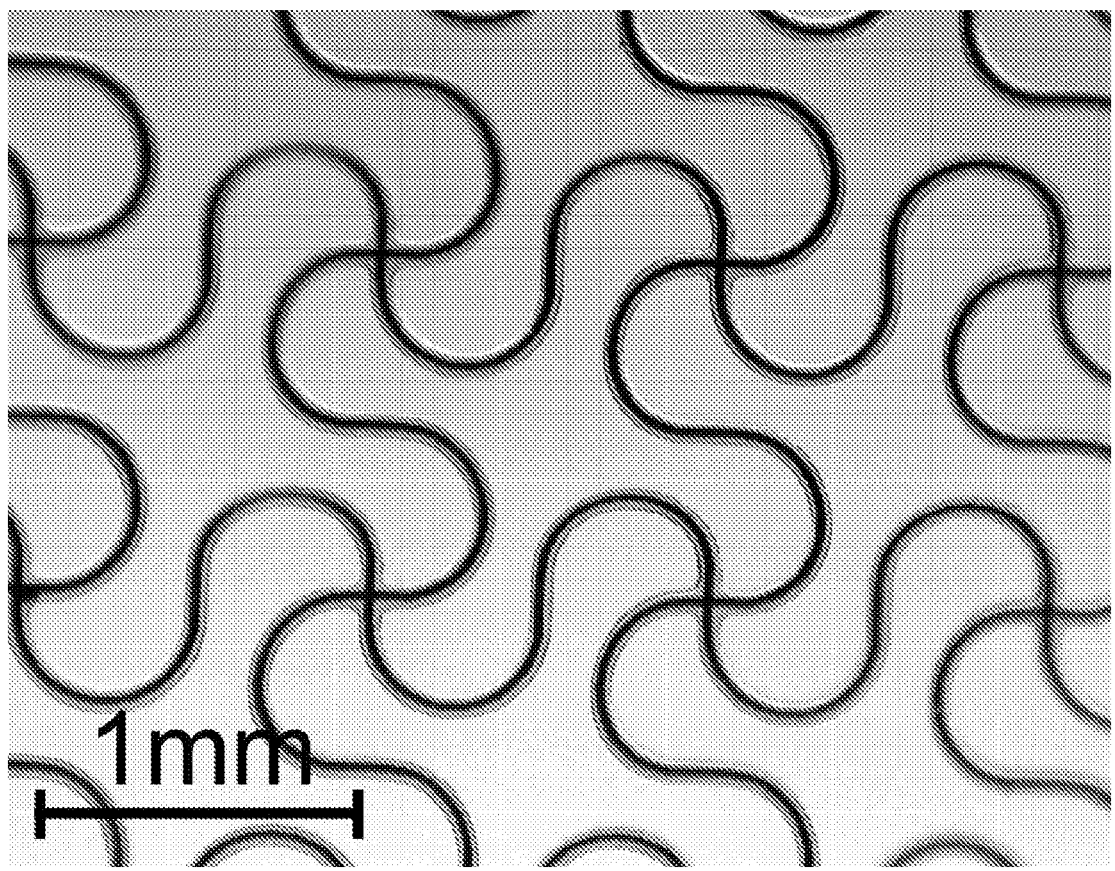
FIG. 5 is a photomicrograph of a released mesh showing the serpentine structure of the thermal resistors. The scale bar is 1 mm.
Figure 6:
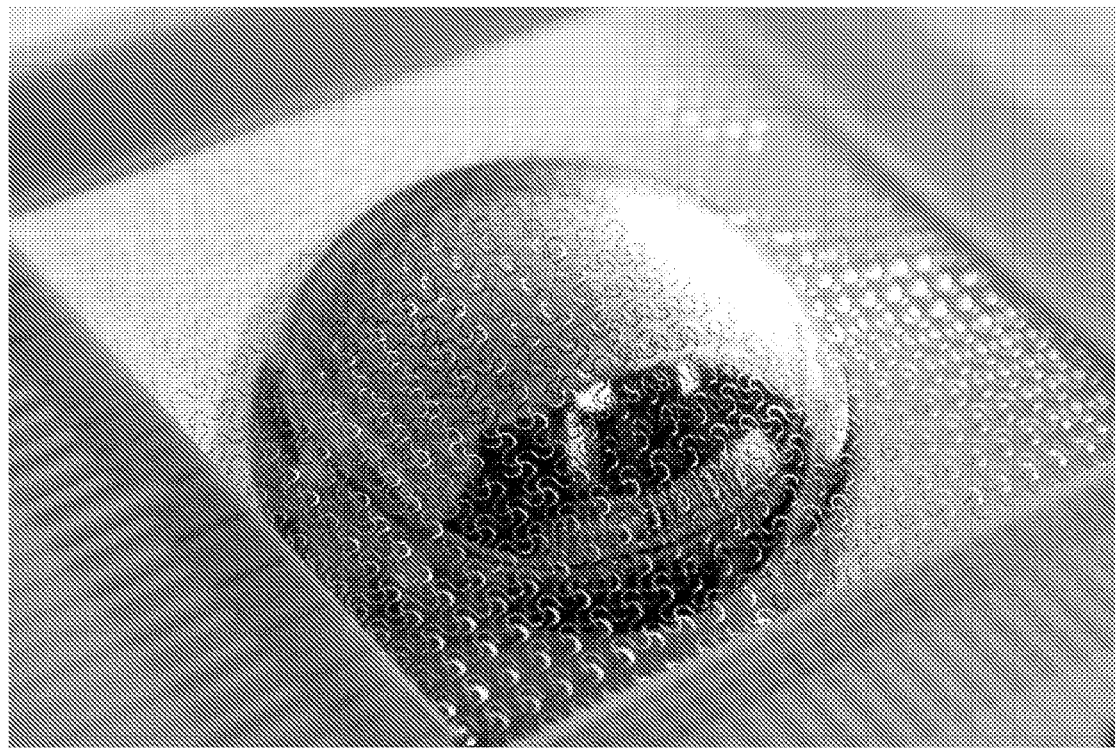
FIG. 6 is a photo of a thermal sensor in conformal contact with a 2.54 cm diameter ball. The thermal imager is operably connected to a printed circuit board ("PCB") for measuring resistance across each of the thermal resistors.

Although the device is fabricated on and/or in flexible polymer (e.g., polyimide) layers, its conformability is still restricted to simple curvatures. In order to improve the thermal imaging or sensing mesh conformability to more complex three-dimensional objects, other thermal resistor patterns are used besides the relatively simple true orthogonal row and column configuration depicted in FIG. 4. For example, a serpentine structure provides improved conformability (FIG. 5). These serpentine patterns stretch under stress without fracture, kinking or undue stress build-up in the thermal resistors. As a result, the stretching of these thermal resistor patterns instead of the pure stretching of the material (as for straight line wires) allows increased conformability and bendability to the fabric, and better conformability to a 3D object. This also helps to alleviate the stress built up on the resistor wires during stretching and prevent breakage. See FIG. 5 for a micrograph of a released mesh showing the serpentine structure of the fabric. As shown in FIG. 5, and the definitions provided herein, the longitudinal directions of the two sets of serpentine thermal resistors are orthogonal (e.g., long axis directions are perpendicular) to each other. FIG. 6 shows the photo of a mesh packaged to the PCB board and stretched over a 2.54 cm diameter ball.

Better conformability comes with the sacrifice of resolution. With the conformability-enhancing serpentine structure, the resolution of the mesh is about 1 mm². This resolution is sufficient for larger scale thermal imaging, but for micro or even nano-scale detections, higher resolution is required. Higher resolution is obtainable by incorporating the interweaving techniques disclosed in U.S. Ser. No. 11/421,173. Interweaving of the adjacent linearly patterned thermal resistor layers permits resolution of the mesh to be less than 1 mm², including less than 100 µm².

EXAMPLE 3

Thermal Imager Testing

Packaging: A 25×25 matrix thermal imaging mesh is tested. Instead of 625 individual thermal sensors, only 50 thermal sensors are used to address the individual entries of the 25×25 matrix. The number of sensors required and corresponding wiring is greatly reduced.

Figure 7A:
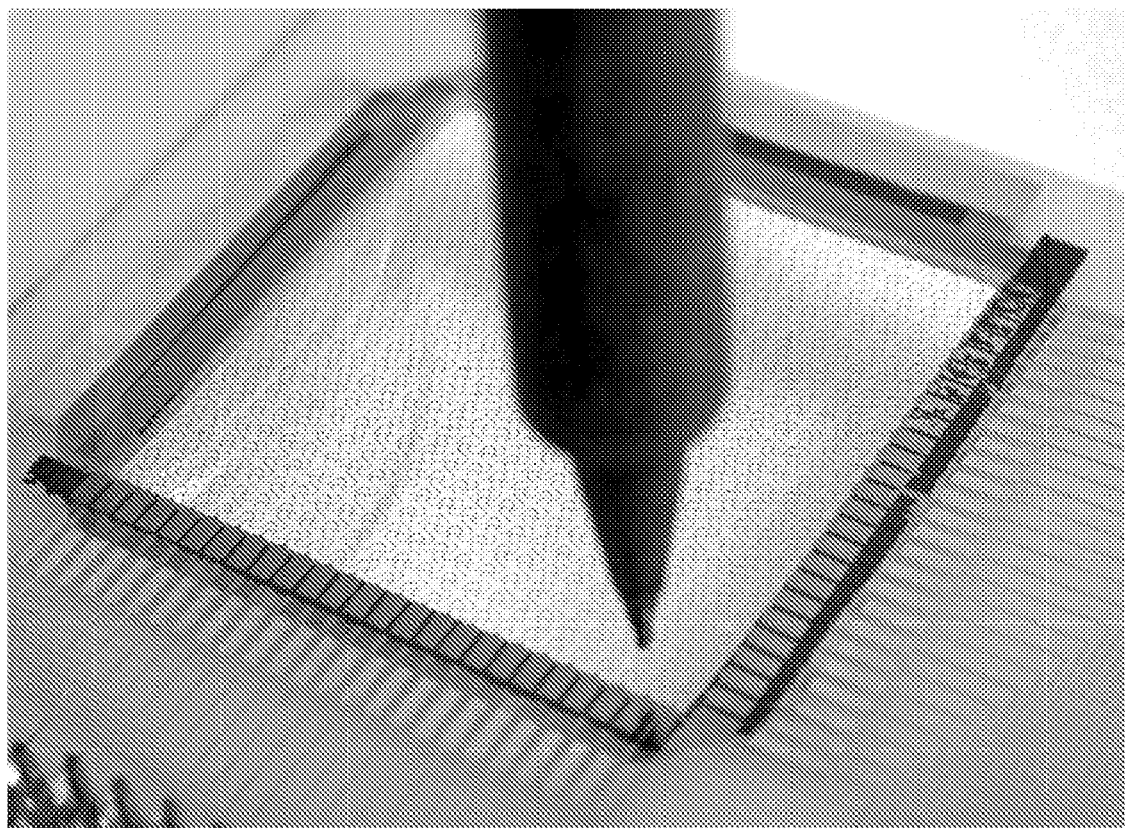
FIG. 7A is a photo of the set-up to evaluate the thermal sensor and shows a tip of a heated soldering iron about 2 mm above the thermal imager connected to the PCB. The thermal imager comprises a serpentine pattern of a 25×25 array of thermistors.

The sample is about 5 cm long across the diagonal. To simplify testing, the sample is packaged to a PCB board with wires routed to 25-pin cable connectors (FIG. 7A). A square opening approximately the size of the sample is first milled out from the PCB board. Electrical connections between the mesh and the PCB board are then achieved using methods known in the art such as ACF (anisotropic conductive film). ACF is originally developed for the LCD panel industry and is useful for electrically connecting flexible structures to rigid surfaces. It exhibits excellent conductivity in the vertical direction in contrast to very large resistance in the lateral direction. It is an excellent solution to high density electrical connections and connections to flexible substrates. Asai et al. (1995) specifically discuss ACF and is specifically incorporated by reference. Opaque ACF tape is used to electrically connect the image sensor to a PCB, as shown in FIG. 7A. The ACF tape can be optically opaque or transparent (Transparent tape available from 3M, St. Paul, Minn.), and is applied under pressure to connect the sensor to the PCB and then cured at about 90° C.

Figure 7B:
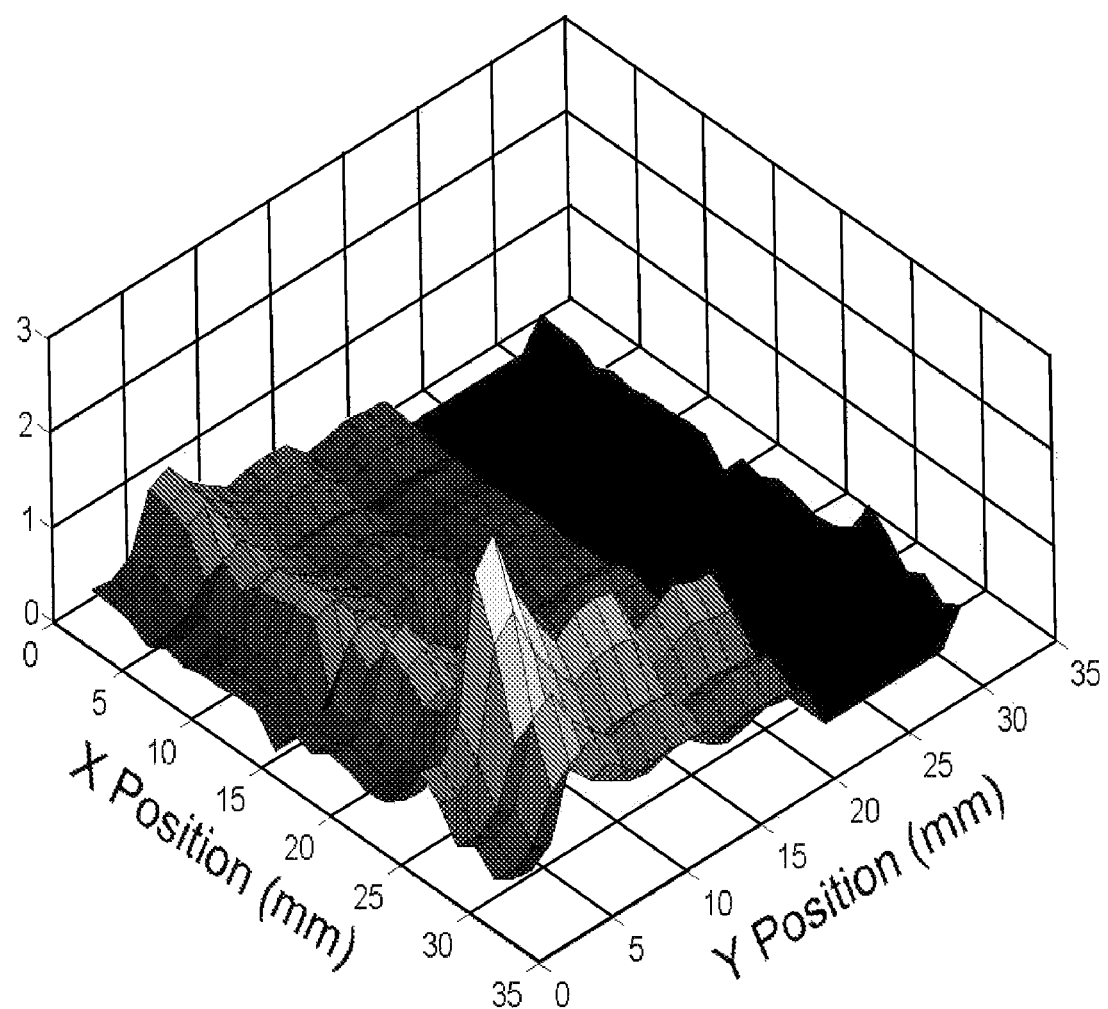
FIG. 7B shows the resultant thermal image obtained by the change in resistances in the thermal resistors within the thermal imager. The z-axis is a plot of the calculated $Z_{(i,j)}$ entry by Formula 1 as a function of thermistor pair position (x, y). The peak corresponds to the location of the localized heat source generated by the soldering iron tip.

Test Setup and Data Processing: First, the original resistance values are recorded without the presence of heat source. Then a soldering iron is used as the localized heat source. The tip of soldering ion is placed approximately 2 mm above the sample. The soldering iron is then heated to 150° C. and the new resistance values are recorded. In this test, resistance measurements use general purpose multimeters. The invention encompasses any means for measuring resistance such as multimeters, ohmmeters, or ammeter-voltmeter. FIG. 7A is a photo of the test setup, showing the heat source tip located in the bottom right corner of the thermal imaging mesh. The percentage change in resistance is then calculated. A simple Matlab® code is used to determine the entries of the matrix using Formula (1) and to generate the 3D graph of the resultant matrix (FIG. 7B). The peak of the thermal image in FIG.

7B corresponds to the location of the localized heat source. Although this example provides a thermal image snap-shot at one time point, real-time imaging is obtained using automated data acquisition and fast-switching circuits, as known in the art, to continuously monitor resistance changes and display a thermal image that can change with time.

Test Results: The original resistance values of the gold thermal resistors are around 400 ohms. The values are not consistent over the entire fabric due the nonuniformity of gold thickness. Effects of nonuniform gold thermal resistor thickness are minimized by generating a thermal image based on percentage change in resistance (see Formula (1)), rather than generating a thermal image based on resistance magnitude. Ideally, the percentage change in resistance is linear with respect to temperature change. A nearly 1% change in resistance is observed for the two thermal resistors directly below the heat source. Varying the thermal resistor composition and dimensions permits the thermal resistor properties to be tailored to expected temperature conditions, such as increasing resistance change over expected temperature conditions to increase the resolution of the thermal image.

The resultant 3D graph is presented in FIG. 7B. Note the 3D graph is oriented in a way so that it corresponds to the actual test setup depicted in FIG. 7A. The graph comprises 625 data points (e.g., 25×25 in the resistance entry $Z_{(i,j)}$ matrix from a total of 50 thermal resistors. Each of the resistance entry Z values spatially corresponds to the crossing point between a thermal resistor in the first layer and a thermal resistor in the second layer (e.g., refer to FIG. 1A). Increasing the number of resistors in the array (or decreasing the distance between adjacent thermal resistors) increases the resolution of the thermal image of FIG. 7B so that finer thermal contours are obtained. A peak is observed at the corresponding location of the heat source. It is apparent that the change in resistance affects all the entries in the corresponding row or column but the effect is intensified at the point of heat source, which is the crossing point of two changing resistors. The "black out" region on the graph is due to the defects in the mesh wherein thermal resistors located in "y-position" 25-30 mm are broken so that a complete circuit for resistance measurement is absent.

This example demonstrates the thermal imaging mesh that is capable of imaging the presence of a localized heat source and conforming to 3D objects. The sensing and processing schemes of the present invention dramatically reduces the number of thermal sensors required to sense a given area and hence greatly reduces the complexity of testing. The serpentine structure of the fabric allows the thermal imager to conform to 3D curvatures like a sphere, or surfaces having edges like a three-dimensional rectangle.

REFERENCES

U.S. patent application Ser. No. 11/421,173, filed May 31, 2006.

J. M. Engel, J. Chen, Z. Fan, and C. Liu, "Polymer micromachined multimodal tactile sensors," Sensors and Actuators, vol. 117, pp. 50-61, 2005.

F. Jiang, Y.-C. Tai, K. Walsh, T. Tsao, G.-B. Lee, and C.-M. Ho, "A flexible MEMS technology and its first application to shear stress sensor skin," presented at IEEE International Conference on MEMS, 1997.

S. Park, K. Mackenzie, and S. Jayaraman, "The wearable motherboard: a framework for personalized mobile information processing (PMIP)," presented at ACM IEEE Design Automation Conference, 2002.

S.-J. Hsieh, and A. Calderson, "Thermal signature for solder defect detection using a neural network approach," Proceeding of SPIE, vol. 4360, pp. 636-643, 2001.

J. Lai, M. Chandrachood, A. Majumdar, and J. P. Carrejo, "Thermal detection of device by atomic force microscopy," IEEE Electron Device Letters, vol. 16, No. 7, pp. 312-315, July 1995.

M. Sergio, N. Manaresi, M. Nicolini, D. Gennaretti, M. Tartagni, and R. Guerrieri "A textile-based capacitive pressure sensor" Sensor Letter, vol. 2, No. 2, pp. 153-160, June 2004.

S. Asai, U. Saruta, M. Tobita, M. Takano, and Y. Miyashita, "Development of an anisotropic conductive adhesive film (ACAF) from epoxy resins," Journal of Applied Polymer Science, vol. 56, No. 7, pp. 769-777, May 16, 1995.

We claim:

1. A thermal sensor comprising an array of thermal resistors, said array comprising:
   a) a first polymer layer having an internal surface;
   b) a first plurality of thermal resistors patterned on said internal surface; each of said thermal resistors of said first plurality are provided in a first longitudinal direction, wherein said thermal resistors of said first plurality are not in direct physical contact with each other;
   c) an insulative polymer layer covering at least a portion of said internal surface and covering said first plurality of thermal resistors, said insulative polymer layer having a top face;
   d) a second plurality of thermal resistors patterned on said insulative polymer layer top face, wherein each of said thermal resistors of said second plurality are provided in a second longitudinal direction, wherein said second longitudinal direction is different than said first longitudinal direction, and wherein said thermal resistors of said second plurality are not in direct physical contact with each other; and
   e) a second polymer layer that covers said second plurality of thermal resistors;
   wherein each of the polymer layers are conformable, and wherein a spatial temperature variation in any of said first or second polymer layer generates a resistance variation in one or more of said thermal resistors.

2. The thermal sensor of claim 1, wherein said thermal resistors comprise wires having a width between 20 μm and 100 μm.

3. The thermal sensor of claim 2, wherein said thermal resistors comprise a material selected from the group consisting of gold, nickel and platinum.

4. The thermal sensor of claim 1 comprising a free-standing structure.

5. The thermal sensor of claim 1 comprising a flexible structure.

6. The thermal sensor of claim 1, wherein said polymer comprises polyimide.

7. The thermal sensor of claim 1 that is capable of conforming to a contoured surface.

8. The thermal sensor of claim 1, wherein said thermal resistors have a curved shape.

9. The thermal sensor of claim 1, wherein said first longitudinal direction is orthogonal to said second longitudinal direction.

10. The thermal sensor of claim 9, wherein said thermal resistors are oriented in a serpentine pattern.

11. The thermal sensor of claim 1 having a thickness that is between 10 μm and 50 μm.

12. The thermal sensor of claim 1 having a spatial resolution of at least 1 mm$^2$.

13. The thermal sensor of claim 1 wherein said first plurality of thermal resistors and said second plurality of thermal resistors form a matrix of n by m thermal resistors, wherein n is between 10 and 100 and m is between 10 and 100.

14. The thermal sensor of claim 1 further comprising a power source operably connected to each of the plurality of thermal resistors and means for measuring the resistance of each of said thermal resistors.

15. A method of making a thermal sensing mesh comprising:
   a) providing a sacrificial layer that covers at least a portion of a substrate;
   b) providing a bottom polymer layer that covers at least a portion of said sacrificial layer;
   c) patterning a first plurality of thermal resistors on said polymer layer, wherein each of said thermal resistors of said first plurality are oriented in a first longitudinal direction;
   d) providing an insulative polymer layer that covers said first plurality of thermal resistors and at least a portion of said bottom polymer layer;
   e) patterning a second plurality of thermal resistors on said insulative layer, wherein each of said thermal resistors in said second plurality are oriented in a second longitudinal direction, wherein said second direction is different than said first direction, and wherein each of said first and second plurality of thermal resistors are individually electrically isolated;
   f) providing a top polymer layer that covers said second plurality of thermal resistors and at least a portion of said insulative polymer layer; and
   g) removing the sacrificial layer to release said polymer layers containing thermal resistors, thereby generating a freestanding thermal sensing mesh.

16. The method of claim 15 wherein said thermal sensing mesh is conformable to a contoured surface.

17. The method of claim 15 further comprising the steps of:
   a) patterning an additional plurality of thermal resistors on said top or bottom polymer layer; and
   b) covering said additional plurality of thermal resistors with an additional polymer layer.

18. The method of claim 15, wherein said insulative and top layers are thin film layers having thicknesses selected from 50 nm to 10 μm.

19. The method of claim 15, wherein said bottom polymer layer is provided using a method comprising:
   a) spinning the polymer on the layer or thermal resistor to be covered;
   b) patterning the polymer in a pattern corresponding to the thermal resistor pattern; and
   c) curing the polymer.

20. The method of claim 15, wherein said step of patterning the plurality of thermal resistors comprises evaporating metal into the desired pattern.

21. The method of claim 15, wherein said step of removing sacrificial layer comprises dissolving or etching said sacrificial layer.

22. The method of claim 15 further comprising the step of providing electrical connections to each of the thermal resistors.

23. The method of claim 22, wherein the step of providing electrical connections uses anisotropic conductive film to connect thermal resistor ends to an electrical conductor.

24. A method of thermal sensing a region, said method comprising:
   a) providing a thermal sensor comprising a first plurality of n thermal resistors oriented in a first direction and a second plurality of m thermal resistors oriented in a second direction, wherein said thermal resistors form a n by m thermal sensor array;
   b) providing an electric potential to each of the thermal resistors;
   c) engaging the thermal sensor with said region to be thermally imaged;
   d) measuring the resistance of each of the thermal resistors; and
   e) calculating a resistance entry $Z_{(i,j)}$ for each of the n by m array according to Formula 1:

$$Z_{(i,j)} = \delta R_{yi} * \delta R_{xj}$$

wherein i refers to the position of an individual thermal resistor in the first plurality of thermal resistors and ranges from 1 to n, j refers to the position of an individual thermal resistor in the second plurality of thermal resistors and ranges from 1 to m, $\delta R_{yi}$ refers to the change in resistance value for a thermal resistor having position i, and $\delta R_{xj}$ refers to the change in resistance value for a thermal resistor having position j.

25. The method of claim 24 further comprising providing an insulative layer between said first plurality and said second plurality of thermal resistors.

26. The method of claim 24 further comprising displaying each of the calculated individual resistance entry to obtain a thermal image.

27. The method of claim 24, wherein n is greater than 10 and m is greater than 10 and less than 1000.

28. The method of claim 24, wherein the region is a solid surface.

29. The method of claim 28 wherein the thermal sensor is in physical contact with said surface.

30. The method claim 28, wherein said surface has a contour profile.

31. The method of claim 25 further comprising converting each of the $Z_{(i,j)}$ entry into a temperature entry to generate a temperature image.

32. The method of claim 24 further comprising the step of providing as output to a user said calculated individual resistance entries.

* * * * *